United States Patent [19]

Tindell

[11] Patent Number: 4,979,699
[45] Date of Patent: Dec. 25, 1990

[54] FLIGHT CONTROL AUGMENTATION INLET DEVICE

[75] Inventor: Runyon H. Tindell, Old Bethpage, N.Y.

[73] Assignee: Grumman Aerospace Corporation, Bethpage, N.Y.

[21] Appl. No.: 357,182

[22] Filed: May 26, 1989

[51] Int. Cl.⁵ .......................... B64C 9/00; B64D 33/02
[52] U.S. Cl. .............................. 244/53 B; 244/75 R; 137/15.1
[58] Field of Search ................. 244/53 R, 53 B, 75 R; 137/15.1, 15.2

[56] References Cited

U.S. PATENT DOCUMENTS

| | | | |
|---|---|---|---|
| 1,822,386 | 9/1931 | Andersen . | |
| 2,668,026 | 2/1954 | Price | 244/52 |
| 2,932,945 | 4/1960 | Brandt | 244/53 B |
| 2,969,939 | 1/1961 | Sulkin et al. | 244/53 |
| 3,129,910 | 4/1964 | Smith | 244/53 B |
| 3,169,728 | 2/1965 | Messerschmitt et al. | 244/23 |
| 3,429,528 | 2/1969 | Kelsey | 244/12 |
| 3,568,694 | 3/1971 | Johnson | 137/15.1 |
| 3,604,663 | 9/1971 | Custer | 244/53 B |
| 3,883,095 | 5/1975 | Fletcher et al. | 244/53 |
| 4,012,013 | 3/1977 | Ball et al. | 244/219 |
| 4,247,066 | 1/1981 | Frost et al. | 244/219 |
| 4,523,603 | 6/1985 | Peikerf | 244/53 B |
| 4,579,300 | 4/1986 | Carr | 244/12.1 |
| 4,763,858 | 8/1988 | Belisle et al. | 244/53 |

FOREIGN PATENT DOCUMENTS 1560911 2/1980 United Kingdom ............. 244/53 B

OTHER PUBLICATIONS

"Phillips, Flight Controls", *McGraw-Hill Encyclopedia of Science and Technology*, 6th Ed., vol. 7, pp. 149-153, 1987.

Whitcomb, "Aerodynamic Wave Drag", *McGraw-Hill Encyclopedia of Science and Technology*, 6th Ed., vol. 7, pp. 141-142, 1987.

*Primary Examiner*—Galen Barefoot
*Attorney, Agent, or Firm*—Bacon & Thomas

[57] ABSTRACT

The invention provides a flight attitude control augmentation arrangement and method which is effective at both low speeds and at high altitudes, under conditions in which traditional flight control surfaces cannot provide sufficient air pressure differentials to develop effective control moments. The invention provides flight control surfaces at the engine air intakes of an aircraft. The flight control surfaces are flaps whose angular position determines the amount by which the intake airstream is perturbed by the flap and the consequent reaction force on the aircraft fuselage, which in turn determines the magnitude of the control moments generated by the surfaces. The net moments resulting from asymmetric deployment of the flaps are used to augment flight control moments generated by conventional flight control such as a rudder.

20 Claims, 3 Drawing Sheets

FLIGHT CONTROL AUGMENTATION INLET DEVICE

BACKGROUND OF THE INVENTION

1. Field of the Invention

This invention relates to the field of aircraft flight control systems, and in particular to a method and system for yaw control augmentation.

2. Description of Related Art

In conventional high speed jet aircraft, the ability to provide flight attitude control at relatively low speeds and/or high altitudes is inherently limited because the ability to generate large control moments depends on the magnitude of pressure differentials generated by movement of air past the control surfaces which in turn depends on the speed and density of air which passes the surfaces during flight. A discussion of the factors which govern the design of control surfaces in high-speed jets is found in the article entitled "Aerodynamic Wave Drag" by Whitcomb, in *McGraw-Hill Encyclopedia of Science and Technology*, 6th Ed., McGraw-Hill Book Company, 1987.

While it is possible to increase the magnitude of control moments generated at low air speeds and high altitudes by suitable design of conventional external control surfaces, such designs necessarily increase the aerodynamic drag caused by those surfaces. Such increased drag is unacceptable in supersonic and near-supersonic aircraft.

Various approaches have been attempted to maximize control while minimizing drag, but the most common approach has been to simply sacrifice aircraft maneuverability and stability in favor of speed. Such compromises have severely limited aircraft performance in a number of areas. In particular, in the case of military fighter aircraft, speed and maneuverability are both essential. Even incremental increases in speed and maneuverability will result in significant increases in aerial combat survivability.

A more sophisticated approach has been to include mechanisms for altering the flight control surfaces according to speed. For example, at high Mach numbers, the wings of the jet may be "swept back" or retracted. This approach suffers from greatly increased complexity, resulting in higher cost, an increase in the probability of failure, and an increase in the weight and thrust requirements of the aircraft. Consequently, while several widely used fighters and other high speed aircraft have adopted this approach, many of the latest high speed aircraft designs continue to employ fixed external control surfaces, despite the above-noted disadvantages.

An alternate proposal has been to use the increased air speed at the jet engine air outlet for flight attitude control augmentation. However, control surfaces placed in the engine exhaust stream suffer from having to withstand the high engine discharge temperature and pressures.

SUMMARY OF THE INVENTION

It is an object of the invention to provide a flight attitude control augmentation arrangement and method which is effective at both low speeds and at high altitudes, under conditions in which traditional flight control surfaces cannot provide sufficient air pressure differentials to develop effective control moments.

It is a further object of the invention to provide such an arrangement and method specifically for yaw control, in order to increase aircraft maneuverability and to enhance the ability to recover from spins without affecting high speed performance of the aircraft.

These objects are accomplished by providing flight control surfaces at the engine air intakes of an aircraft. The flight control surfaces are, in a preferred embodiment of the invention, flaps whose angular position determines the amount by which the intake airstream is perturbed by the flap and the consequent reaction force on the aircraft fuselage, which in turn determines the magnitude of the control moments generated by the surfaces. The net moments resulting from asymmetric deployment of the flaps are used to augment flight control moments generated by conventional flight control such as a rudder.

By providing two such flaps, a net control moment in either yawing direction can be developed. The angular position of each flap is determined by a computer which calculates the necessary flap angle to achieve a desired rudder control augmentation moment in response to rudder pedal position. Calculation of the flap angle is based on predetermined angular position-to-moment profiles, taking into account air speed and angle of attack as necessary.

At supersonic speeds, the flaps are completely closed so as to minimize their effect on the aerodynamic profile of the aircraft. At lower speeds, when flight control augmentation is not desired, the flaps may be pivoted fully outward so as to increase the air supply to the engine.

Control of the flaps is preferably effected by pivoting one of the flaps inwardly from a maximum flap angle, the flaps being normally opened which provides the additional advantage of automatically increasing the air supply to the engine at low speeds and/or high altitudes whenever flight control augmentation is not in use.

DESCRIPTION OF THE PREFERRED EMBODIMENT

Figure 1:
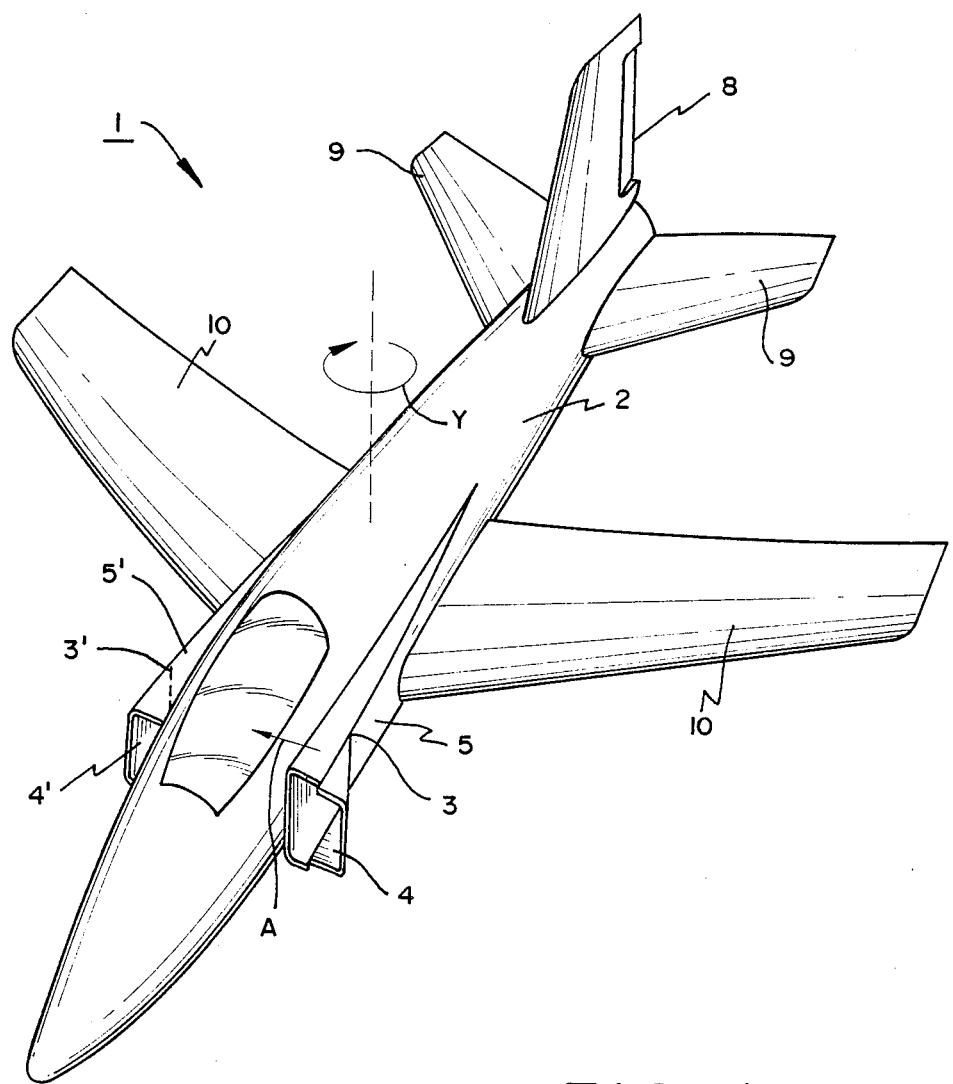
FIG. 1 is a perspective view of a jet incorporating the preferred arrangement for flight control augmentation.

FIG. 1 shows a jet aircraft 1 which incorporates the preferred flight control augmentation system. The aircraft is meant to be illustrative only, the fuselage and external control surfaces such as the wings, elevators, and tail forming no part of the invention. It will be apparent to those skilled in the art that the invention is applicable to a wide variety of aircraft design configurations.

The jet 1 shown in FIG. 1 is a high speed jet aircraft of the type having two engine air intakes 5 and 5' which provide air to an engine (not shown) or engines located to the rear of the intakes. Flight attitude control is normally provided by a rudder 8 which causes the jet to turn about its yaw axis, as indicated by arrow Y, and also by flight control surfaces on tail wings 9 and wings 10 for assisting the rudder and for providing pitch and elevation control.

Tail wings 9 may be moveable as a unit or may include separately movable elevators or flaps. Also, ailerons or flaps may be provided on wings 10. The exact control arrangement provided by external aerodynamic control surfaces on wings 10, tail wings 9, and rudder 8 forms no part of this invention and is consequently not shown.

The invention is intended to be useable with a wide variety of arrangements of wing flaps and other external control surfaces. Examples of typical external flight control arrangements are found in Phillips, "Flight Controls", *McGraw-Hill Encyclopedia of Science & Technology*, 6th Ed , Vol. 7. pg. 151.

Each of the dual intakes 5, 5' is provided at its inlet with a flap 4, 4' pivotal about axes 3 and 3' respectively. As will be explained in more detail below, unless flaps 4 and 4' are asymmetrically deployed, no yawing effect is obtained. It will be recognized, of course, that air perturbation means other than flaps may be substituted, so long as the effects of the substitute means on the intake airstream is essentially the same as that of the flaps, which will be described in more detail below.

The thrust of the airplane engine is augmented when flaps 4 and 4' are simultaneously opened because opening of the flaps increase the air supply pressure to the engine. In the preferred embodiment, the flaps are designed to open at relatively low Mach numbers, for example below Mach 0.40, providing a significant advantage in low speed efficiency without affecting high speed performance, because the flaps may be pivoted to a closed position at high speeds. When the flaps are closed, they should have no effect on the aerodynamic profile of the aircraft.

When yaw augmentation is required, for example during combat maneuvering, one or both of the flaps are asymmetrically adjusted. The effect is to generate a control moment which adds to or subtracts from the yawing moments generated by the conventional control surfaces described above.

In the perspective view shown in FIG. 1, flap 4 is open and flap 4' is closed. This will generate an asymmetric moment indicated by arrow A to cause the airplane to turn towards the right as viewed from the pilot's perspective. The manner in which the asymmetric moment is generated will be explained in more detail in connection with FIGS. 5(a), 5(b), and 6.

The rudder 8 is shown as being positioned to also turn the aircraft in the direction of arrow A, and thus the asymmetric moment generated by flaps 4 and 4' augments the yawing moment generated by rudder 8.

It will be noted that flaps 4 and 4' are shown enlarged for illustrative purposes. It is anticipated that flap dimensions on the order of 20 inches or less would be satisfactory in most cases.

The amount of yaw augmentation provided by the arrangement of the preferred embodiment can be very significant. Moments on the order of 25% or greater of rudder capability have been achieved in wind tunnel tests.

As suggested above, the flaps may be added to virtually any conventional or advanced fighter configuration, and also to other types of aircraft, without the need for modification of other external flight attitude control surfaces. Also, in addition to yaw control, those skilled in the art will recognize that the use of flaps at the engine air intake inlets could be applied to pitch control by placing the flaps at the upper and lower edges of one or more of the engine air intakes. Finally, it is in principle possible to apply the flaps of the invention to single engine air intake configurations.

Figure 2:
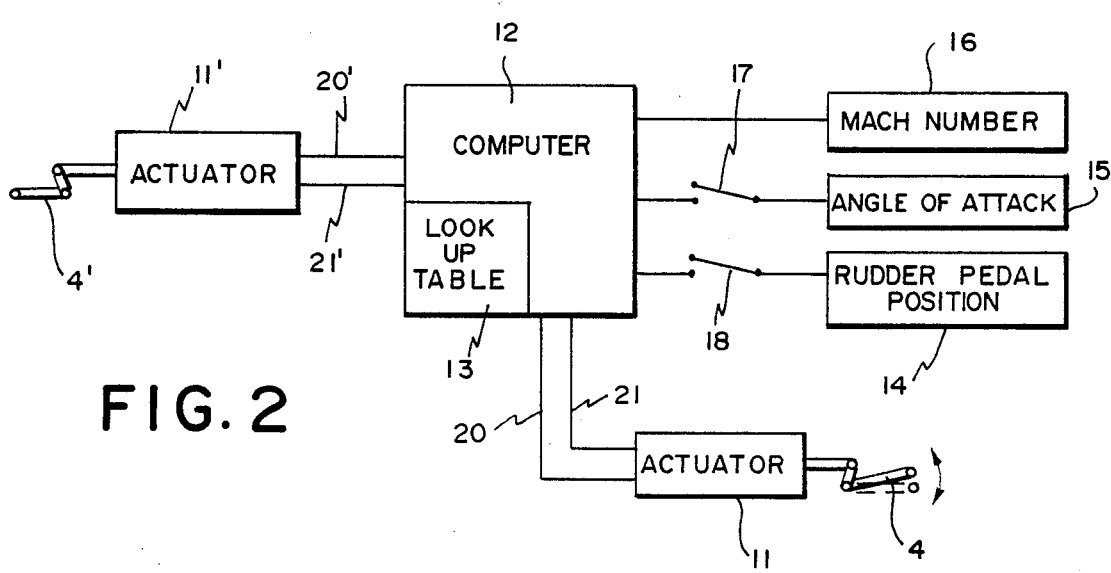
FIG. 2 shows a system for controlling the flap of FIG. 1.
Figure 3:
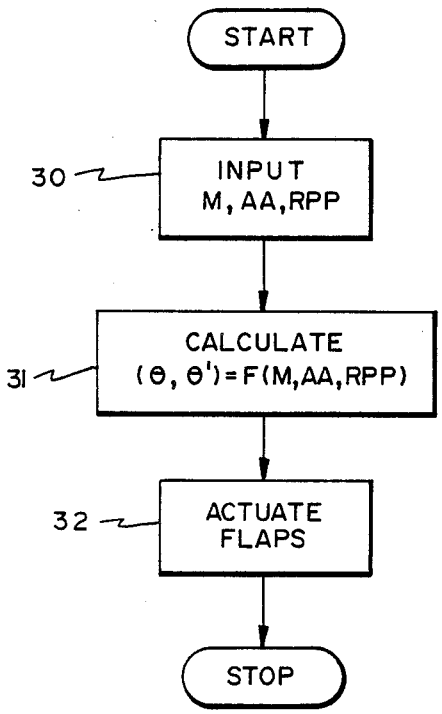
FIG. 3 illustrates a method for controlling the flap of FIG. 1.
Figure 4:
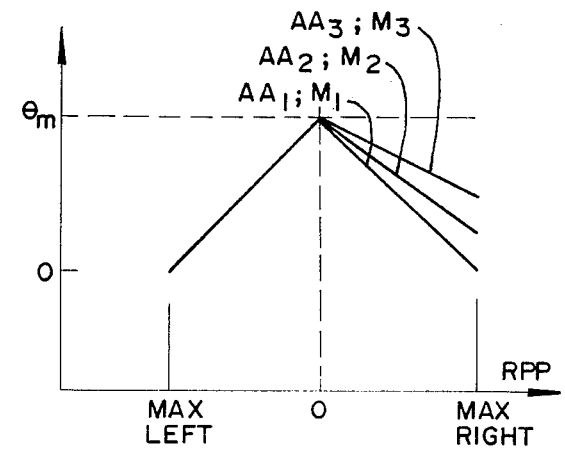
FIG. 4 illustrates exemplary relationships between rudder pedal position and flap angle.

As shown in FIGS. 2–4, the control system for the flaps includes a computer 12 and actuators 11, 11'. Similar control systems are known in the art for the purpose of rudder control or elevator control, as disclosed in the Phillips article, cited above. Actuators 11, 11' may take the form of a solenoid, motor, or hydraulic arrangement.

The computer 12 includes conventional input interfaces for inputting rudder pedal position data 14, angle of attack data 15, and Mach number 16. Sensors for obtaining the above-mentioned data are well known in the context of conventional flight control systems.

The rudder pedal position data (RPP) is used to control the position of the actuator as shown in FIG. 3, subject to adjustments for angle of attack (AA), as will be explained below, and to speed or Mach number (M) to insure that the flaps are not improperly deployed. The computer 12 first inputs the necessary data (Step 31), then calculates the flap angle as a function of the data (Step 32), and finally activates flap actuators 11, 11'.

Switches 17 and 18 are included to disable the actuator flight control augmentation. Alternatively, flap control may be automatically initiated as a function of angle of attack and/or Mach number.

In an especially advantageous system, the flaps are controlled as follows: As shown in FIG. 4, at low Mach numbers both flaps are normally open to a maximum angle $\theta$ m. When the rudder is actuated, the angle of one of the flaps is decreased linearly according to rudder pedal position (RPP), the asymmetry producing the yaw augmentation. The curves or functions of FIG. 4, i.e., the amount by which the flap is opened for a given rudder pedal position, are determined experimentally by measuring the moments produced for a given flap angle, and by selecting the amount of yaw augmentation desired for a particular rudder pedal position. The selection of linear functions is essentially a matter of convenience.

Controlling the flaps by decreasing $\theta$ from an initially open position is preferred because of the thrust augmentation effects of the open flaps. However, it will be recognized that it is also within the scope of the invention to have the flaps normally closed, with the rudder opening, as opposed to closing, the flaps selectively according to rudder pedal position (RPP).

In the graph of FIG. 4. separate curves for $\theta$ as a function of rudder pedal position have been drawn for different values of the Mach number ($M_1$, $M_2$, $M_3$) and angle of attack ($AA_1$, $AA_2$, $AA_3$). In practice, the functions may vary only slightly in respect to angle of attack and/or Mach number. Whether separate linear functions of $\theta$ in respect to rudder pedal position must be taken into account depends on the specific flight characteristics and air intake design of the aircraft to which the flaps are applied, and on the specific flap shape and dimensions chosen. Of course, if the curves are invariant in respect to the Mach number and angle of attack, then $\theta$ may be calculated solely as a function of the rudder pedal position.

In practice, the curves may be stored in the form of look-up tables 13 in which $\theta$ is determined by the computer using matrix addresses determined from inputs 14–16.

Figure 5A:
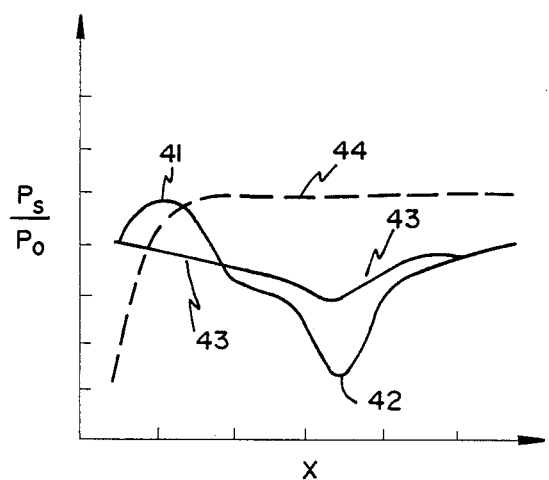
FIG. 5(a) illustrates the pressure distributions which create the yawing moments in an open flap position.
Figure 5B:
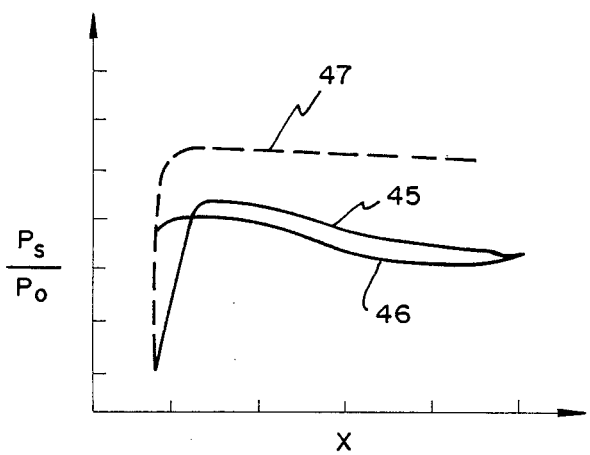
FIG. 5(b) illustrates, for comparison, the pressure distributions in a closed flap configuration.
Figure 6:
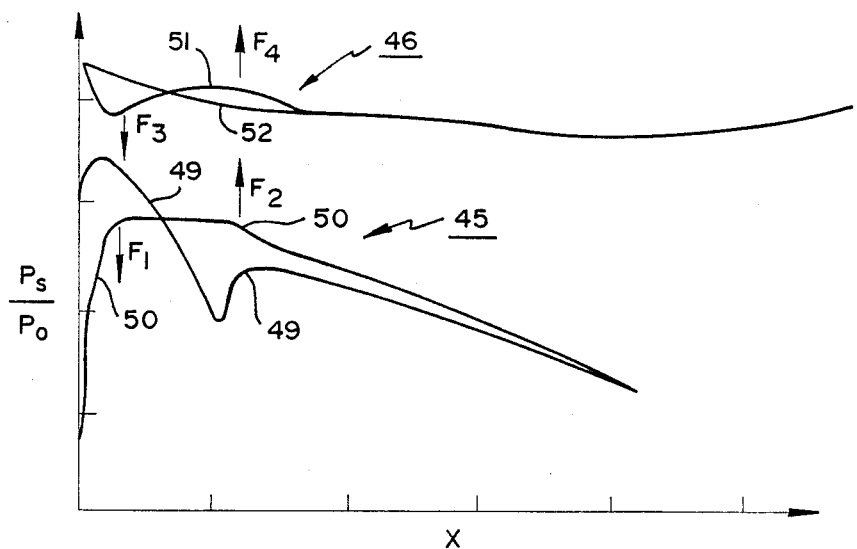
FIG. 6 is a graph showing net control moments for a two flap arrangement.

FIGS. 5*a*, 5*b*, and 6 show graphs of analytically determined pressure distributions $P/P_0$ from which the moments obtained for specific angles of $\theta$ can be calculated. From these distributions, the above-described relationships between $\theta$, AA, M and RPP may be obtained. The variable x in all three Figures is the distance from the intake inlet taken along the vertical centerline of the intake. The data in FIGS. 5*a*, 5*b* and *c* were obtained using the computerized panel method VSAERO, which is commercially available.

The pressure curves illustrated are exemplary only as the actual pressure distributions will vary according to the geometry of the intake on which the flap is used, the aerodynamic configuration of the aircraft to which the flaps are applied, and such factors as the increase in air speed within the intake caused by the opening of a flap. However, the manner in which the pressure curves are obtained and used to calculate moments will be the same for all flap and intake configurations, and thus the following description should enable anyone skilled in the art to obtain and utilize the data necessary to select a flap configuration, program the above-described computer 12, and therefore practice the invention for a wide variety of aircraft.

The first pressure distribution necessary to generate control moments is indicated by reference numerals 41 and 42 in FIG. 5(*a*). which show pressure distributions for an intake having an open flap. Reference numerals 41 and 42 show the pressure along the center line of an air intake having an open flap at an airspeed of Mach 0.2, the flap being deployed at an angle of 45 degrees and having a length of 20 inches, although it may be necessary to use pressure distributions integrated over the entire area of the intake if the pressure distributions vary away from the centerline.

The pressure initially rises above ambient pressure as indicated at 41, but drops well below ambient pressure in the area of the hinge, which corresponds to reference numeral 42, due to the engine suction and due to the expansion around the hinge corner.

The inner wall of the duct, on the other hand, as indicated by curve 43, remains relatively constant at a sub-ambient pressure. The contribution of each side of the intake to the net force moment is simply the integral of the pressure curves over the area in question.

In addition, the moments generated by the arrangement are affected by the external air pressure which remains essentially constant at slightly higher than ambient pressure as indicated by line 44, and thus the integral of curve 44 must also be included in the moment calculation.

FIG. 5*b* shows corresponding curves for an undeployed flap. The inner duct wall pressure is slightly lower than the outer duct wall pressure, while the external pressure again is fairly constant above ambient pressure. The moment contributions are calculated for an undeployed flap in the same manner as the moments for a deployed flap.

The specific shape of the flap, particularly the front tip of the flap, will of course have an effect on the performance of the flap. In general, to avoid supersonic airflow caused by expansion around the leading edge of the flap, which may lead to shocks and shock-boundary layer losses, the leading edge of the flap should be contoured rather than sharp.

In many configurations, the angle of attack will not have a significant effect on the pressure distributions for angles of attack of, for example, less than 50 degrees, and therefore it may be possible to eliminate this factor from moment calculation.

FIG. 6 shows combined distribution curves for a dual-intake configuration with one flap open and the other closed. In calculating the resulting moments, the effect on inlet flow velocity may have a significant effect, either adding to or subtracting from, the moments resulting from the shape of the flap and its angle of deployment.

Curve 49 is the net interior pressure distribution for the intake with the open flap, and curve 50 is the net pressure distribution for the interior of the closed flap intake. Curve 51 represents pressures along the exterior of the open flap intake, while curve 52 represents pressures along the exterior of the closed flap intake. The integral of the differences in distributions is proportional to the net moments produced, indicated by arrows F1, F2, F3 and F4, the sum of which give the amount of yaw control augmentation.

Functioning and operation of the invention will be readily understood by those skilled in the art from the foregoing and further explanation herein is not considered necessary.

Manifestly, changes in details of construction can be effected in the shown and described embodiment without departing from the spirit and scope of the invention as defined in and limited solely by the appended claims.

I claim:

1. An arrangement for augmenting a flight attitude control system of an aircraft, wherein the aircraft has an engine air intake duct having a leading edge area defining an air intake airstream guide, comprising:
   a flap pivotally connected at said leading edge area of said air intake, and flap control means for controlling the angular position of said flap relative to the aircraft fuselage to disturb the intake airstream so as to create a directional control reaction force on the aircraft fuselage during flight sufficient to alter a flight attitude characteristic of said aircraft.

2. An arrangement as claimed in claim 1, wherein said flight attitude control system includes a rudder and said flight attitude characteristic is yaw.

3. An arrangement as claimed in claim 1, wherein said flap control means includes actuator means for actuating said flap and a computer programmed to control said actuator means to vary said angular position of said flap as a function of the position of a main flight attitude control means for controlling said flight attitude control system.

4. An arrangement as claimed in claim 3, wherein said main flight attitude control means includes a rudder pedal.

5. An arrangement as claimed in claim 3, wherein said computer is programmed to also control said flap angle as a function of aircraft angle of attack.

6. An arrangement as claimed in claim 3, wherein said computer is programmed to also control said flap angle as a function of aircraft speed.

7. An arrangement for augmenting a flight attitude control system of an aircraft, wherein the aircraft has two engine air intakes, one on each side of the aircraft, each said engine air intake including a duct having a leading edge area defining an air intake airstream guide, comprising:

a flap pivotally connected at said leading edge area of one of said air intakes, and flap control means for controlling the angular position of said flap relative to the aircraft fuselage to disturb the intake airstream so as to create a directional control reaction force on the aircraft fuselage during flight sufficient to alter a flight attitude characteristic of said aircraft.

8. An arrangement as claimed in claim 7, wherein said flight attitude control system includes a rudder and said flight attitude characteristic is yaw.

9. An arrangement as claimed in claim 7, further including a second flap pivotally connected at the leading edge area of the other of said air intakes, said flaps being asymmetrically pivoted by said flap control means.

10. An arrangement as claimed in claim 7, wherein said flap control means includes actuator means for actuating said flap and a computer programmed to control said actuator means to vary said angular position of said flap as a function of the position of a main flight attitude control means for controlling said flight attitude control system.

11. An arrangement as claimed in claim 10, wherein said main flight attitude control means includes a rudder pedal.

12. An arrangement as claimed in claim 10, wherein said computer is programmed to also control said flap angle as a function of aircraft angle of attack.

13. An arrangement as claimed in claim 10, wherein said computer is programmed to also control said flap angle as a function of aircraft speed.

14. An aircraft comprising:
an engine air intake duct having a leading edge area defining an intake airstream guide; and
means located at said leading edge area for affecting said intake airstream so as to create a directional control reaction force on the aircraft fuselage during flight sufficient to alter a flight attitude characteristic of said aircraft.

15. An aircraft comprising:
two engine air intake ducts, each having a leading edge area defining an intake airstream guide; and
means located at a leading edge area of one of said intakes for affecting said intake airstream so as to create a directional control reaction force on the aircraft fuselage during flight sufficient to alter a flight attitude characteristic of said aircraft.

16. A method for controlling an aircraft flight directional characteristic wherein the aircraft has an engine air intake duct having a leading edge area defining an intake airstream guide, comprising the steps of:
(a) providing a pivoting flap at said leading area and a control means for controlling the angular position of the flap relative to the aircraft body;
(b) moving the flap relative to the aircraft body during flight to a degree sufficient to disturb the intake airstream so as to create a directional control reaction force on the aircraft body and thereby alter a flight attitude characteristic of the aircraft.

17. A method as claimed in claim 16, further including the step of providing a second control means for controlling the angular position of a second flap connected to a second air intake duct located on an opposite side of the aircraft from said first air intake duct and asymmetrically moving at least one of the flaps such that different flight attitude control moments are generated by each flap resulting in a net flight attitude control moment sufficient to change the flight attitude of said aircraft.

18. A method as claimed in claim 17, further comprising the step of symmetrically opening both flaps at low air speeds to augment the air supply to the engine when flight attitude changes resulting from movement of said flaps is not desired.

19. A method as claimed in claim 18, further comprising the step of closing both of said flaps at high air speeds such that said flaps have minimal effect on the high speed aerodynamic profile of said aircraft.

20. A method for controlling an aircraft flight attitude characteristic, the aircraft including an engine air intake duct having a leading edge area defining an intake airstream guide, comprising the step of:
controlling air perturbation means located at said leading edge area for causing perturbations in said airstream so as to create a directional control reaction force on the aircraft fuselage during flight sufficient to alter the flight attitude characteristic of the aircraft.

* * * * *